(12) United States Patent
Fay

(10) Patent No.: US 12,389,086 B2
(45) Date of Patent: Aug. 12, 2025

(54) PERSONALIZED EMERGENCY ALERT

(71) Applicant: SATURN LICENSING LLC, New York, NY (US)

(72) Inventor: Luke Fay, San Diego, CA (US)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 18/048,676

(22) Filed: Oct. 21, 2022

(65) Prior Publication Data

US 2023/0179835 A1 Jun. 8, 2023

Related U.S. Application Data

(63) Continuation of application No. 16/795,352, filed on Feb. 19, 2020.

(51) Int. Cl.
*H04N 21/258* (2011.01)
*H04N 21/81* (2011.01)
*G06Q 10/02* (2012.01)

(52) U.S. Cl.
CPC ..... *H04N 21/814* (2013.01); *H04N 21/25841* (2013.01); *G06Q 10/02* (2013.01)

(58) Field of Classification Search
CPC . H04N 21/814; H04N 21/25841; G06Q 10/02
See application file for complete search history.

(56) References Cited

U.S. PATENT DOCUMENTS

| 9,037,108 B1 | 5/2015 | Delatorre |
| 9,773,047 B2 | 9/2017 | Chu et al. |
| 2001/0051876 A1* | 12/2001 | Seigel ............ G06F 16/9537 705/26.1 |
| 2009/0210262 A1 | 8/2009 | Rines et al. |
| 2009/0249460 A1 | 10/2009 | Fitzgerald et al. |
| 2010/0146541 A1* | 6/2010 | Velazquez ............ H04N 21/814 725/33 |
| 2010/0218209 A1 | 8/2010 | Kendall |
| 2014/0143801 A1 | 5/2014 | Russell et al. |
| 2015/0032484 A1 | 1/2015 | Mermelstein |
| 2015/0149220 A1 | 5/2015 | Omar |
| 2015/0256902 A1 | 9/2015 | Fusco et al. |
| 2016/0149657 A1 | 5/2016 | Kurihara et al. |
| 2016/0295300 A1 | 10/2016 | Alman et al. |
| 2019/0058909 A1 | 2/2019 | Eyer et al. |

(Continued)

FOREIGN PATENT DOCUMENTS

| JP | 2009069999 A | 4/2009 |
| WO | WO-2018016295 A1 * | 1/2018 ........... H04N 21/814 |

OTHER PUBLICATIONS

Advanced Television Systems Committee, ATSC Standard: Companion Device, Oct. 2, 2019, Doc. A/338:2019 (Year: 2019).*

(Continued)

*Primary Examiner* — Nasser M Goodarzi
*Assistant Examiner* — Alexander Boyd
(74) *Attorney, Agent, or Firm* — Chris Kolefas

(57) ABSTRACT

Techniques are described for expanding and/or improving the Advanced Television Systems Committee (ATSC) 3.0 television protocol in robustly delivering the next generation broadcast television services. Reverse 911 emergency alerts are personalized to a user of each receiver in the ATSC 3.0 system.

18 Claims, 5 Drawing Sheets

(56) References Cited

U.S. PATENT DOCUMENTS

2019/0289370 A1  9/2019  Deshpande et al.
2020/0005409 A1  1/2020  Rowden et al.

OTHER PUBLICATIONS

"RFC 4033, DNS Security Introduction and Requirements," Arends, R., Austein, R., Larson, M., Massey, D., and S. Rose, Internet Engineering Task Force, Fremont, CA, Mar. 2005.
"RFC 4055, Additional Algorithms and Identifiers for RSA Cryptography for use in the Internet X.509 Public Key Infrastructure Certificate and Certificate Revocation List (CRL) Profile," J. Schaad, B. Kaliski, R. Housley, Internet Engineering Task Force, Fremont, CA, Jun. 2005.
"ATSC Implementation Team Document—ATSC 3.0 Advanced Emergency Information System—Implementation Guide", ATSC, Feb. 20, 2019.
"ATSC Standard: ATSC 3.0 Interactive Content (A/344)", May 2, 2019.
"ATSC Standard: ATSC 3.0 Security and Service Protection (A/360)", Aug. 20, 2019.
"ATSC Standard: ATSC 3.0 System (A/300)", May 15, 2020.
"ATSC Standard: Signaling, Delivery, Synchronization, and Error Protection (A/331)", Jun. 19, 2019.
"RFC 3279, Algorithms and Identifiers for the Internet X.509 Public Key Infrastructure Certificate and Certificate Revocation List (CRL) Profile," L. Bassham, W. Polk, R. Housley, Internet Engineering Task Force, Fremont, CA, Apr. 2002.
"RFC 5280, Internet X.509 Public Key Infrastructure Certificate and Certificate Revocation List (CRL) Profile," D. Cooper, S. Santesson, S. Farrell, S. Boeyen, R. Housley, W. Polk, Internet Engineering Task Force, Fremont, CA, May 2008.
"RFC 5289, TLS Elliptic Curve Cipher Suites with SHA-256/384 and AES Galois Counter Mode (Gcm)," E. Rescorla, Internet Engineering Task Force, Fremont, CA, Aug. 2008.
"RFC 5480, Elliptic Curve Cryptography Subject Public Key Information," S. Turner, D. Brown, K. Yiu, R. Housley, T. Polk, Internet Engineering Task Force, Fremont, CA, Mar. 2009.
"RFC 5652, Cryptographic Message Syntax (CMS)," R. Housley, Internet Engineering Task Force, Fremont, CA, Sep. 2009.
"RFC 5751, Secure/Multipurpose Internet Mail Extensions (S/MIME) Version 3.Message Specification," B. Ramsdell, S. Turner, Internet Engineering Task Force, Fremont, CA, Jan. 2010.
"RFC 5753, Use of Elliptic Curve Cryptography (ECC) Algorithms in Cryptographic Message Syntax (CMS)," S. Turner, D. Brown, Internet Engineering Task Force, Fremont, CA, Jan. 2010.
"RFC 5758, Internet X.509 Public Key Infrastructure: Additional Algorithms and Identifiers for DSA and ECDSA," Q. Dang, S. Santesson, K. Moriarty, D. Brown, T. Polk, Internet Engineering Task Force, Fremont, CA, Jan. 2010.
"RFC 5940, Additional Cryptographic Message Syntax (CMS) Revocation Information Choices," S. Turner, R. Housley, Internet Engineering Task Force, Fremont, CA, Aug. 2010.
"RFC 6960, X.509 Internet Public Key Infrastructure Online Certificate Status Protocol—OCSP," S. Santesson, M. Myers, R. Ankney, A. Malpani, S. Galperin, C. Adams, Internet Engineering Task Force, Fremont, CA, Jun. 2013.
"RFC 5019, The Lightweight Online Certificate Status Protocol (OCSP) Profile for High-Volume Environments," A. Deacon, R. Hurst, Internet Engineering Task Force, Fremont, CA, Sep. 2007.

\* cited by examiner

PERSONALIZED EMERGENCY ALERT

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in "ATSC 3.0 System" (A/300) for delivering the next generation of broadcast television. ATSC 3.0 supports delivery of a wide range of television services including televised video, interactive services, non-real time delivery of data, and tailored advertising to a large number of receiving devices, from ultra-high definition televisions to wireless telephones. ATSC 3.0 also orchestrates coordination between broadcast content (referred to as "over the air") and related broadband delivered content and services (referred to as "over the top"). ATSC 3.0 is designed to be flexible so that as technology evolves, advances can be readily incorporated without requiring a complete overhaul of any related technical standard. Present principles are directed to such advances as divulged below.

SUMMARY

As understood herein, ATSC 3.0 provides for emergency alerts. However, emergency alerts are monolithic and provide very little information regarding the scope and imminence or the instant danger, etc.

Accordingly, present principles provide an ATSC 3.0-based emergency alert system that provides personalized information regarding an imminent threat. This information can include an amount of time before the threat is life threatening, identification and directions to a nearest shelter, and an automatic booking of the user into the safest hotel nearest the user's receiver. The receiver in response to the alert may contact the emergency alert (broadcaster) server to provide additional information. If the user is not present as indicated by lack of an acknowledgement input to the receiver, the system may attempt to locate the user via a GPS location of the user's phone and call the user.

A digital television apparatus includes at least one transmitter assembly with at least one processor programmed with instructions to access respective location information for respective first and second receivers indicating respective first and second locations. The instructions are executable to broadcast an emergency alert altered at least in part with the location information such that the first receiver presents first information in the emergency alert and the second receiver presents second information in the emergency alert different from the first information.

The first receiver may not present the second information. Further, the first receiver may be configured to contact the second receiver via other distribution methods (for example, internet communication) and not rely on the transmitter containing user information.

In example embodiments, the first information includes one or more items in an amount of time before a threat subject to the emergency alert is life threatening at the first location, an identification and directions to a shelter nearest the first location, and notification of an automatic booking of a user into a hotel nearest the first location. In example implementations the transmitter instructions may be executable to, responsive to not receiving, within a period, an acknowledgement of the reverse 911 emergency alert from the first receiver, access information associated with the first receiver to identify a phone number and call the phone number.

Generally, an emergency alert, sometimes referred to as a "reverse 911", refers to a public safety communications technology used by public safety organizations to communicate with groups of people in a defined geographic area. The system uses a database of end user identifying information including end user receiver information in conjunction with geographic information to deliver emergency notifications to a selected set of service subscribers. According to A/300, features of an emergency alert (sometimes referred to as a "reverse 911") appear in several documents within the ATSC 3.0 suite of standards which are listed in A/300.

In another aspect, a digital television system includes digital television transmitter equipment configured with instructions to generate a first emergency alert tailored to a first location in an emergency alert coverage area. The first emergency alert indicates a first emergency. The transmitter equipment is further configured to generate a second emergency alert tailored to a second location in the emergency alert coverage area, with the second emergency alert indicating the first emergency and containing information different from information in the first emergency alert. The transmitting equipment is configured to transmit the first emergency alert to a first receiver at the first location, and to transmit the second emergency alert to a second receiver at the second location.

In another aspect, in a digital television system, a method includes transmitting a first alert of a first emergency to a first receiver. The first alert contains information identified at least in part based on a first location associated with the first receiver. The method further includes transmitting a second alert of the first emergency to a second receiver, with the second alert containing information identified at least in part based on a second location associated with the second receiver.

The details of the present application, both as to its structure and operation, can best be understood in reference to the accompanying drawings, in which like reference numerals refer to like parts, and in which:

DETAILED DESCRIPTION

Figure 1:
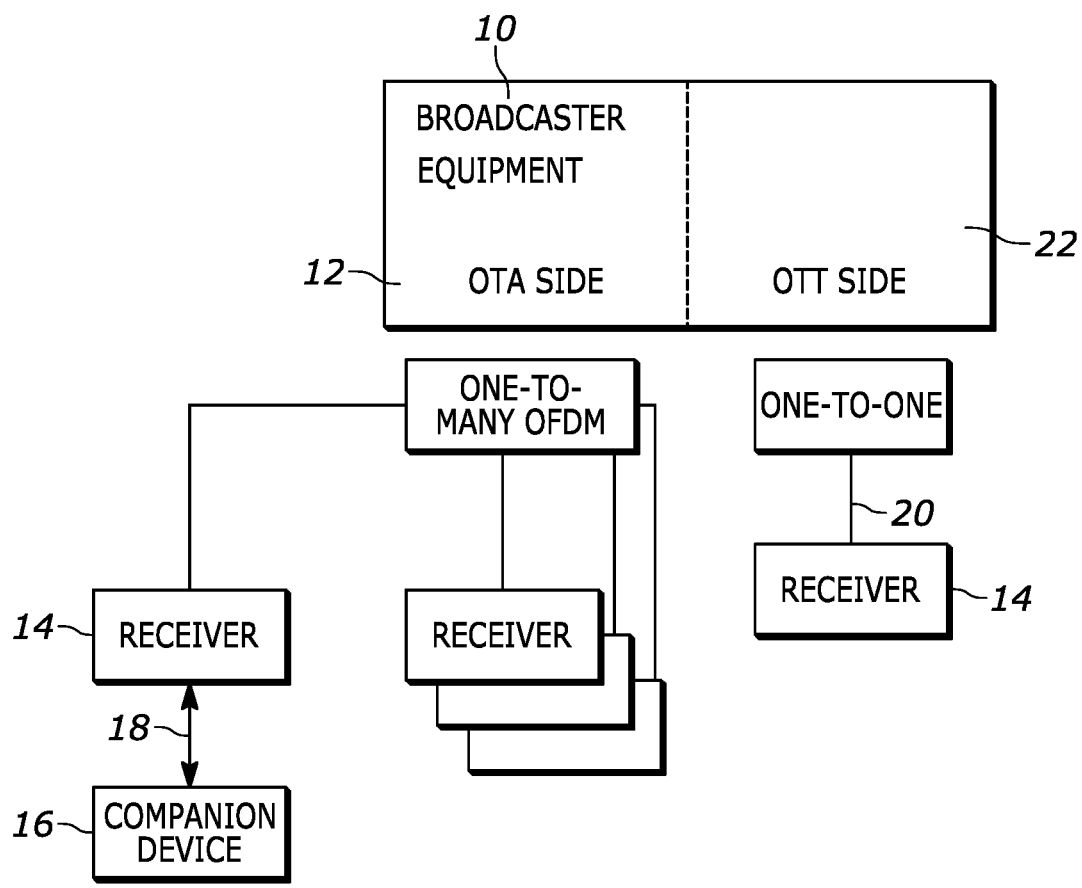
FIG. 1 is a block diagram of an Advanced Television Systems Committee (ATSC) 3.0 system.

This disclosure relates to technical advances in digital television such as in Advanced Television Systems Committee (ATSC) 3.0 television. An example system herein may include ATSC 3.0 source components and client components, connected via broadcast and/or over a network such that data may be exchanged between the client and ATSC 3.0 source components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access websites hosted by the Internet servers discussed below.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java®/JavaScript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television channel and may also receive related content, including television, OTT (broadband). Note that computerized devices described in all of the figures herein may include some or all of the components set forth for various devices in FIGS. 1 and 2.

Figure 2:
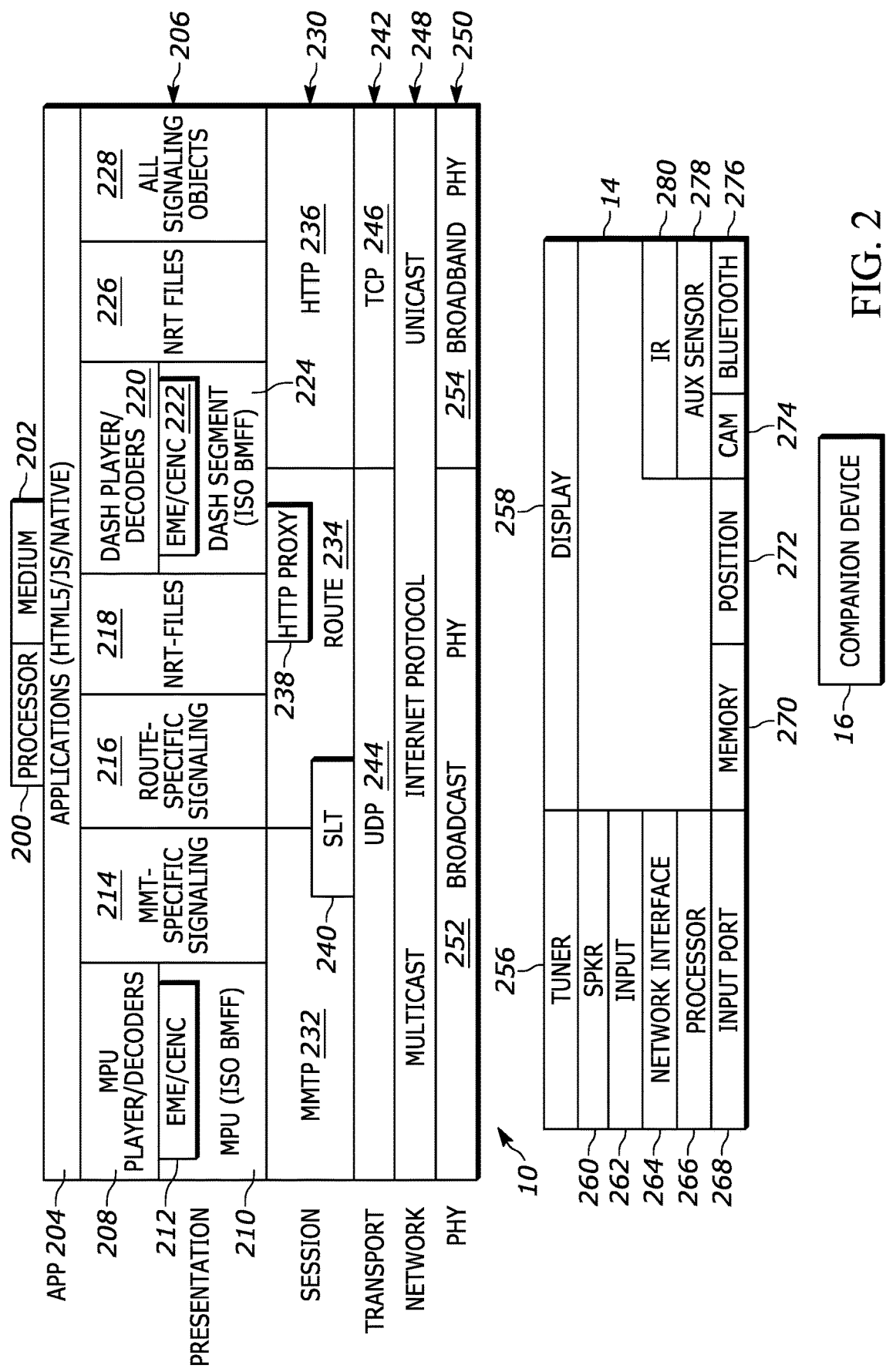
FIG. 2 is a block diagram showing components of the devices shown in FIG. 1.

Referring now to FIG. 2, details of examples of components shown in FIG. 1 may be seen. FIG. 2 illustrates an example protocol stack that may be implemented by a combination of hardware and software. Using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)). FIG. 2 also illustrates an example stack with hardware that may be embodied by a receiver.

Disclosing FIG. 2 in terms of broadcaster equipment 10, one or more processors 200 accessing one or more computer storage media 202 such as any memories or storages described herein may be implemented to provide one or more software applications in a top-level application layer 204. The application layer 204 can include one or more software applications written in, e.g., HTML5/JavaScript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC)-4 format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/ common encryption (CENC) module 212.

FIG. 2 further illustrates that on the broadcast side the presentation layer 206 may include signaling modules, including either moving picture experts group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to stored replacement advertisements.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/ BMFF format.

As was the case for the broadcast side, the broadband side of the presentation layer 206 may include NRT content in files 226 and may also include signaling objects 228 for providing play back signaling.

Below the presentation layer 206 in the protocol stack is a session layer 230. The session layer 230 includes, on the broadcast side, either MMTP protocol 232 or ROUTE protocol 234.

On the broadband side the session layer 230 includes HTTP protocol 236 which may be implemented as HTTP-secure (HTTP(S). The broadcast side of the session layer 230 also may employ a HTTP proxy module 238 and a service list table (SLT) 240. The SLT 240 includes a table of signaling information which is used to build a basic service listing and provide bootstrap discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses (UDP 244 and on the broadband side transmission control protocol (TCP) 246.

The example non-limiting protocol stack shown in FIG. 2 also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts Internet Protocol (IP) packets to be suitable to be transported over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile sent through the various protocols (HTTP/TCP/IP) in the protocol stack may be used on the broadband side. Media files in the DASH-IF profile based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with an ATSC 3.0 TV tuner (equivalently, set top box controlling a TV) 256. The receiver 14 may be an Android®-based system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is configured to undertake present principles (e.g. communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/ microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or, the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g. receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g. all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 3:
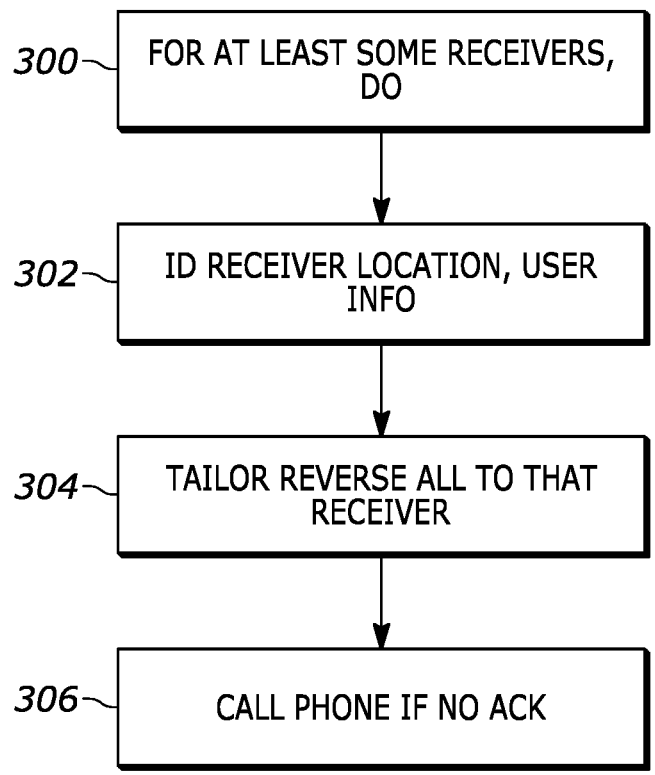
FIG. 3 is a flow chart of example logic consistent with present principles.

Now referring to FIG. 3, the OTA 12 and/or OTT 22 assembly may, for at least some and preferably most or all of the receivers 14 in the digital television system, enter an emergency alert (also referred to herein as a reverse 911) routine at block 300 in which, at block 302, for each receiver the location of the receiver is identified, as well as certain user information of the receiver. The location of the receiver may be identified by causing the receiver to send its GPS location information to the digital television system. Or, the location may be manually input by a user. Or, the location may be obtained in other ways, such as by having the receiver triangulate its location using signals from multiple transmitters in the digital television system or in another system such as base stations in a wireless telephony network in the event that the receiver has a wireless telephony transceiver.

The user information, which may include demographic information, a cell phone number, and information pertaining to special needs of people in the home in which the receiver is located may be obtained from the purchaser of the receiver at the point of sale. Or, the cell phone number to be associated with the receiver for use described further below may be looked up by the broadcaster using a database that correlates locations (in this case, the address corresponding to the location of the receiver) with cell phone numbers. Yet again, the user information may be input to the receiver by a user as described below in connection with FIG. 5. Other techniques to gather the user information.

Proceeding to block 304, in the event of an emergency alert situation such as an approaching storm, detected possible earthquake, or other situations, an emergency alert is generated by the digital television broadcaster and tailored for at least some of the receivers 14 in the system using the respective location and user information of each receiver. Thus, a first receiver 14 presents first information in the emergency alert and a second receiver 14 presents second information in the emergency alert different from the first information. Some information presented on one receiver is thus not presented on the other, and vice-versa.

Or, the first receiver may use the information directly to contact the second receiver to determine user presence. Once user location is determined, appropriate action can automatically take place whether finding evacuation routes, hotel reservations, etc. are to be made available.

Examples of tailoring this information include but are not limited to an amount of time before a threat subject of the emergency alert is life threatening at the receiver location, directions to a shelter nearest the receiver location, and an automatic booking of a user into a hotel nearest the receiver location along with a notification thereof.

In the event of a possibility that no one is viewing the receiver to detect the emergency alert as might be indicated by, e.g., lack of an acknowledgement input to the receiver within a period of time following broadcast of the alert, the logic may move to block 306. At block 306 the phone number associated with the receiver as obtained at block 302 may be called with a recorded audible alert that may contain some or all of the information discussed herein in audible form.

Figure 4:
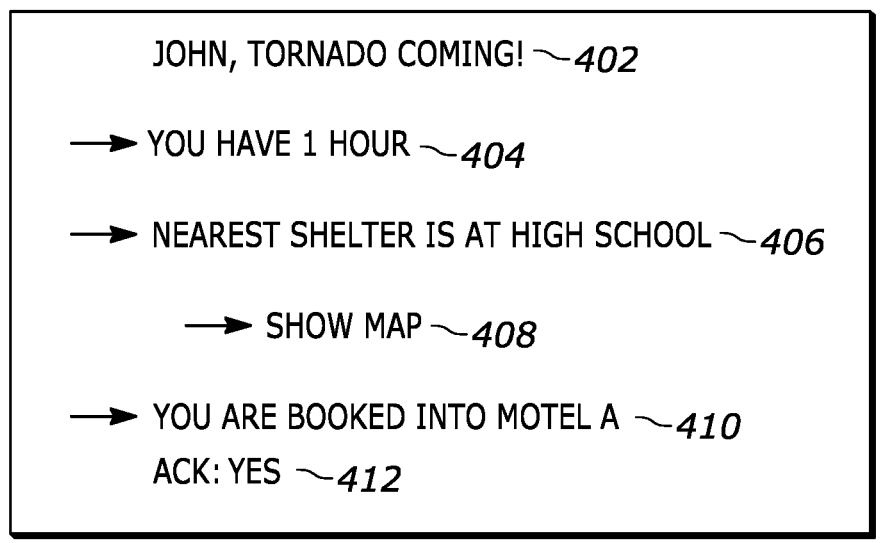
FIG. 4 is a screen shot of an example emergency alert presented on a receiver.

FIG. 4 illustrates further. A UI 400 may be presented on a display of the receiver as shown in which an identification 402 of the nature of the alert is resented, in the example shown, a tornado. If the name of a user associated with the receiver is known, the name may appear in the alert 402.

In examples, an advisory 404 may be presented indicating a future time at which the event that is subject to the alert is expected to become life threatening at the location of the receiver. For example, the advisory 404 may indicate that the tornado will arrive in one hour. Similar advisories may be presented for emergencies such as wildfires, etc.

Also, an advisory 406 may be presented indicating the location of nearest shelter to the location of the receiver that people can seek. This location may be obtained using a database of shelters and their locations and then selecting the shelter closest to the location of the receiver. In some cases, the closest shelter may not be designated as "safe" for the particular emergency, such as a tornado, in which case the indicated shelter is the closest safe (e.g., tornado-hardened) shelter to the receiver. A selector 408 may be presented and may be selectable using, e.g., a remote control (RC) to cause the display to present a map showing the route from the receiver location to the shelter.

Also, the emergency alert system may access a database of lodgings and automatically book a room at a lodging nearby the location of the receiver at the closest location determined to be safe from the emergency, and a notification 410 of this may be presented on the display. An acknowledgement selector 412 may be presented and may be selectable using, e.g., the RC to enable a viewer of the receiver to transmit an acknowledgement of having seen the UI 400 to the digital television system so that the system can dispense with the phone call at block 306 of FIG. 3.

Figure 5:
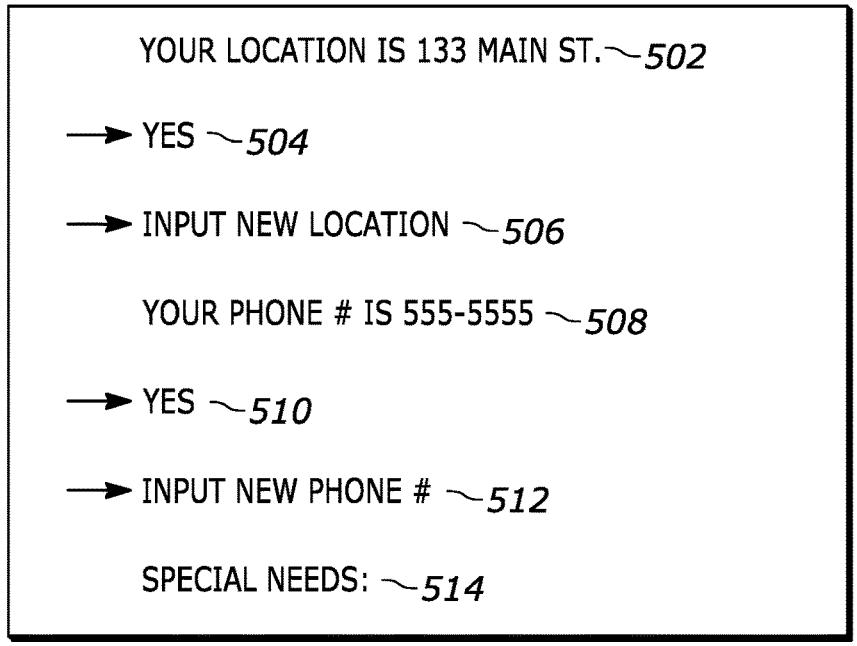
FIG. 5 is a screen shot of an example UI for establishing user information.

FIG. 5 illustrates a UI 500 that may be presented on the receiver display to enable gathering the user information discussed above in relation to block 302 in FIG. 3. An advisory 502 may be presented indicating the location of the receiver as best identified by the digital television using example techniques described herein. When the receiver reports its location in terms of GPS coordinates or triangulated latitude and longitude coordinates, the digital television system may access a map to correlate the location to a street address as indicated in FIG. 5, which typically is more understandable to the user.

A selector 504 may be presented for the user to confirm the location shown at 502. If the location is incorrect the user may input the correct address in a filed 506. Similarly, the user's phone number to be called in the event that block 306 in FIG. 3 requires execution may be presented at 508, and the user may confirm this number by selecting a confirm selector 510. If the number is incorrect the user may input the correct number in a field 512. The user may input any special needs of persons in the household at block 514, e.g., that one of the occupants of the location is blind, or elderly, etc.

Figure 6:
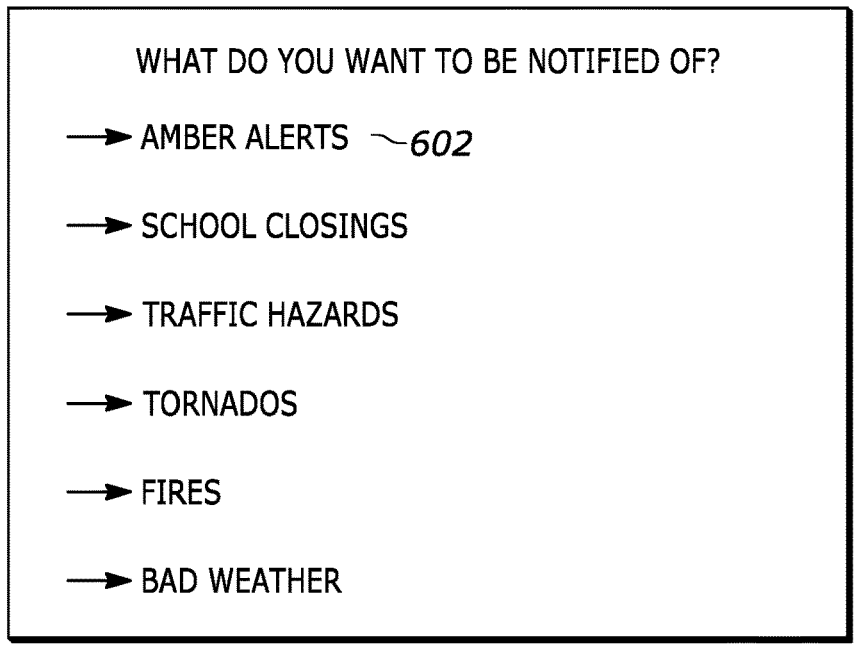
FIG. 6 is a screen shot of an example UI for selecting events to be notified of/acted upon.

FIG. 6 illustrates a UI 600 that may be presented on a receiver such as an ATSC 3.0 TV. The UI 600 may present a list 602 of events that a user can select to be notified of.

This may be implemented using filter codes as described in ATSC standard "Signaling, Delivery, Synchronization, and Error Protection (A/331)" that can be set up to use content codes such as entertainment identification registry (EIDR) codes which trigger what content is available to consumers. The filter codes, as indicated in the non-limiting example of FIG. 6, may include amber alerts, school closings, traffic hazards, tornados, inclement weather, fires, etc.

Figure 7:
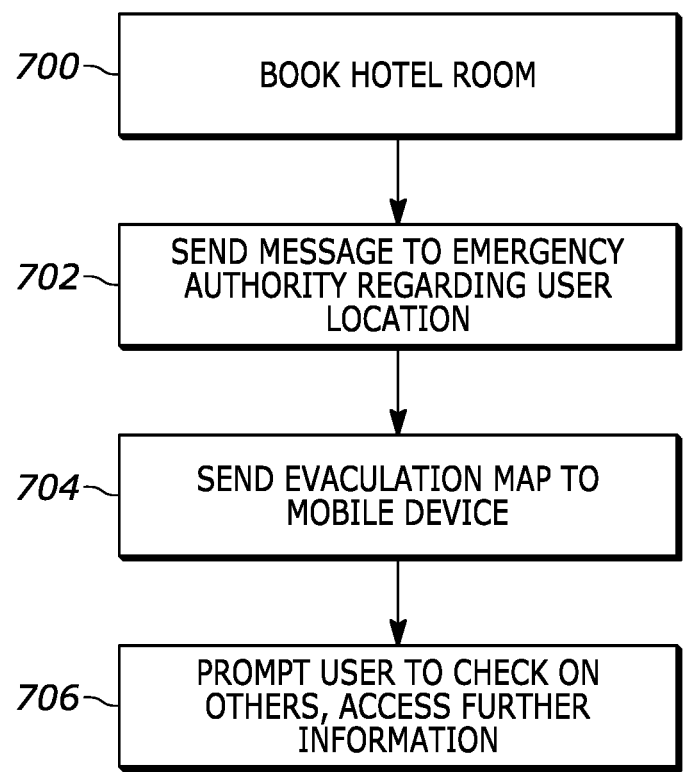
FIG. 7 is a flow chart illustrating example receiver logic on an implementation.

Present principles recognize that in emergencies, panic is a natural reaction and so it would be advantageous to use an ATSC 3.0 receiver to help remove panic or anxiety so that people can remain calm and focus on what needs to be done. FIG. 7 provides illustration.

Commencing at block 700, a receiver in response to an emergency alert (either pre-programmed or based on receiving an alert selected from, e.g., FIG. 6) automatically may search for nearby hotel rooms for the user and may automatically secure a booking into an available room. Also, at block 702 the receiver may automatically send an electronic or telephonic or other message to an emergency authority such as the local constabulary indicating the location of one or more users as indicated by, e.g., motion detectors in the dwelling in which the receiver is located, face recognition based on time-stamped images rendered by a camera on the receiver, etc. As another example, upon receipt of an emergency alert the receiver, knowing the phone number(s) as may be input using FIG. 5, may "ping" the mobile device(s) of the user(s) for a location report, and relay the location(s) to the emergency authority.

Block 704 indicates that the receiver may obtain evacuation maps in response to an emergency alert and send the map(s) to the mobile device(s) or use artificial intelligence to inform users with advanced warning of coming danger. The alerts can be sent to other devices (phones) the user has setup/informed to the ATSC 3.0 receiver allowing information to flow even if the user is not in the immediate area (such as on vacation). Block 706 indicates that the receiver further may prompt a user to check on others, such as neighbors, to check on safety or other matters, and to obtain additional information, e.g., by presenting a link the user can select for additional information.

In a non-limiting example ATSC:A/331:2019 section A.3.3.2.3 filter codes are used in extensions to fast data transfer (FDT)-Instance elements along with the broadcaster emergency information to trigger a process (including AI) of taking next steps for consumer safety. Existing online services and user data may be used to provide options for a consumer as he faces emergencies.

It will be appreciated that whilst present principals have been described with reference to some example embodiments, these are not intended to be limiting, and that various alternative arrangements may be used to implement the subject matter claimed herein.

What is claimed is:
1. A digital television system comprising:
at least one transmitter assembly comprising circuitry configured to:
obtain location information of a receiver;
obtain evacuation map information and accommodations reservation information corresponding to the location information;
transmit an emergency alert to the receiver; and
transmit the evacuation map information and the accommodations reservation information to the receiver,
wherein the receiver comprises circuitry configured to:
receive the emergency alert;
receive the evacuation map information and the accommodations reservation information;

automatically obtain an accommodations reservation based on the accommodations reservation information; and send, via a network, the evacuation map information and the accommodations reservation information to a companion device associated with the receiver, wherein the receiver and the companion device are is an Advanced Television Systems Committee (ATSC) 3.0 receiver and the companion device is an ATSC 3.0 companion device compatible.

2. The digital television system of claim 1, wherein the circuitry of the receiver is configured to provide the location information.

3. A receiver comprising:
circuitry configured to:
receive data via broadcast;
communicate via a network;
receive an emergency alert via broadcast;
receive evacuation map information and accommodations reservation information via at least one of the broadcast or the network, the evacuation map information and the accommodations reservation information being associated with the emergency alert and corresponding to location information indicative of a location of the receiver;
automatically obtain an accommodations reservation based on the accommodations reservation information; and
send, via the network, the evacuation map information and the accommodations reservation information to a companion device associated with the receiver,
wherein the receiver is an Advanced Television Systems Committee (ATSC) 3.0 receiver and the companion device is an ATSC 3.0 companion device.

4. The receiver of claim 3, wherein the circuitry comprises an ATSC 3.0 tuner and is configured to receive data in accordance with a moving picture experts group (MPEG) media transport protocol (MMTP) or a real-time object delivery over unidirectional transport (ROUTE) protocol.

5. The receiver of claim 3, comprising a global positioning satellite (GPS) receiver, the GPS receiver being configured to determine the location of the receiver.

6. The receiver of claim 3, wherein the evacuation map information includes information on a shelter corresponding to the location information.

7. The receiver of claim 3, wherein the circuitry comprises a network interface configured to wirelessly communicate with the companion device directly or via the network.

8. The receiver of claim 3, comprising a sensor to determine a user location, wherein the circuitry is configured to process the emergency alert at least in part on a basis of the user location.

9. The receiver of claim 3, wherein the circuitry is configured to determine whether a user acknowledgement of the emergency alert has been received within a period of time and to cause communication with a user device to be performed if it has not.

10. The receiver of claim 3, wherein the circuitry is configured to control communicating with another receiver configured to receive an emergency alert.

11. The receiver of claim 3, wherein the circuitry is configured to send the location information via the network.

12. The receiver of claim 3 comprising:
a display; and
a speaker,
wherein the display and the speaker are configured to output audiovisual content received via at least one of the broadcast or the network.

13. A method of a receiver, the method comprising:
receiving data via broadcast;
communicating via a network;
receiving an emergency alert via broadcast;
receiving evacuation map information and accommodations reservation information via at least one of the broadcast or the network, the evacuation map information and the accommodations reservation information being associated with the emergency alert and corresponding to location information indicative of a location of the receiver;
automatically obtaining an accommodations reservation based on the accommodations reservation information; and
sending, via the network, the evacuation map information and the accommodations reservation information to a companion device associated with the receiver,
wherein the receiver is an Advanced Television Systems Committee (ATSC) 3.0 receiver and the companion device is an ATSC 3.0 companion device.

14. The method of claim 13, wherein the broadcast is an ATSC 3.0 broadcast and conveys data in accordance with a moving picture experts group (MPEG) media transport protocol (MMTP) or a real-time object delivery over unidirectional transport (ROUTE) protocol.

15. The method of claim 13, wherein the evacuation map information includes information on a shelter corresponding to the location information.

16. The method of claim 13 comprising wirelessly communicating with the companion device directly or via the network.

17. The method of claim 13 comprising determining a user location and processing the emergency alert at least in part on a basis of the user location.

18. The method of claim 13 comprising determining whether a user acknowledgement of the emergency alert has been received within a period of time, and causing communication with a user device to be performed if it has not.

* * * * *